United States Patent
Yancey

(10) Patent No.: US 8,443,366 B1
(45) Date of Patent: May 14, 2013

(54) TECHNIQUES FOR ESTABLISHING A PARALLEL PROCESSING FRAMEWORK FOR A MULTI-TENANT ON-DEMAND DATABASE SYSTEM

(75) Inventor: Scott Yancey, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 629 days.

(21) Appl. No.: 12/636,675

(22) Filed: Dec. 11, 2009

(51) Int. Cl.
| | |
|---|---|
| G06F 9/46 | (2006.01) |
| G06F 15/173 | (2006.01) |
| G06F 7/00 | (2006.01) |
| G06F 17/30 | (2006.01) |

(52) U.S. Cl.
USPC ............ 718/102; 709/226; 707/769; 707/764; 707/713

(58) Field of Classification Search ............. 718/1–106; 709/223–226; 707/713–721, 764, 769–771
See application file for complete search history.

(56) References Cited

U.S. PATENT DOCUMENTS

| | | | |
|---|---|---|---|
| 5,072,370 | A | 12/1991 | Durdik |
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,787,437 | A | 7/1998 | Potterveld et al. |
| 5,794,232 | A | 8/1998 | Mahlum et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,941,947 | A | 8/1999 | Brown et al. |
| 5,950,190 | A | 9/1999 | Yeager et al. |
| 5,963,953 | A | 10/1999 | Cram et al. |
| 5,974,409 | A | 10/1999 | Sanu et al. |
| 5,987,471 | A | 11/1999 | Bodine et al. |
| 6,064,656 | A | 5/2000 | Angal et al. |
| 6,085,191 | A | 7/2000 | Fisher et al. |
| 6,092,083 | A | 7/2000 | Brodersen et al. |
| 6,112,198 | A | 8/2000 | Lohman et al. |
| 6,169,534 | B1 | 1/2001 | Raffel et al. |
| 6,178,425 | B1 | 1/2001 | Brodersen et al. |
| 6,189,000 | B1 | 2/2001 | Gwertzman et al. |
| 6,189,011 | B1 | 2/2001 | Lim et al. |

(Continued)

FOREIGN PATENT DOCUMENTS

WO 2004059420 7/2004

OTHER PUBLICATIONS

First named inventor: Calahan, Patrick, U.S. Appl. No. 12/954,556, filed Nov. 24, 2010.

(Continued)

*Primary Examiner* — Abdullah Al Kawsar
(74) *Attorney, Agent, or Firm* — Blakely, Sokoloff, Taylor & Zafman, LLP

(57) ABSTRACT

In accordance with embodiments, there are provided techniques for establishing a parallel processing framework in a multi-tenant on-demand database system. These techniques for establishing a parallel processing framework in a multi-tenant on-demand database system may enable embodiments to provide great flexibility to a tenant of the architecture to perform desired functions on content of the database without unduly consuming the resources of the system.

15 Claims, 8 Drawing Sheets

U.S. PATENT DOCUMENTS

| | | |
|---|---|---|
| 6,216,135 B1 | 4/2001 | Brodersen et al. |
| 6,219,667 B1 | 4/2001 | Lu et al. |
| 6,226,641 B1 | 5/2001 | Hickson et al. |
| 6,233,617 B1 | 5/2001 | Rothwein et al. |
| 6,233,618 B1 | 5/2001 | Shannon |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,330,560 B1 | 12/2001 | Harrison et al. |
| 6,336,137 B1 | 1/2002 | Lee et al. |
| 6,341,288 B1 | 1/2002 | Yach et al. |
| 6,345,288 B1 | 2/2002 | Reed et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,438,562 B1 | 8/2002 | Gupta et al. |
| 6,446,089 B1 | 9/2002 | Brodersen et al. |
| 6,446,109 B2 | 9/2002 | Gupta |
| 6,453,038 B1 | 9/2002 | McFarlane et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,578,037 B1 | 6/2003 | Wong et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,148 B1 | 8/2003 | Salo et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,658,417 B1 | 12/2003 | Stakutis et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,765 B2 | 4/2004 | Ghosh et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,839,680 B1 | 1/2005 | Liu et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,944,133 B2 | 9/2005 | Wisner et al. |
| 6,947,927 B2 | 9/2005 | Chaudhuri et al. |
| 7,076,633 B2 | 7/2006 | Tormasov et al. |
| 7,152,109 B2 | 12/2006 | Suorsa et al. |
| 7,174,483 B2 | 2/2007 | Becher et al. |
| 7,185,192 B1 | 2/2007 | Kahn |
| 7,206,805 B1 | 4/2007 | McLaughlin, Jr. |
| 7,206,807 B2 | 4/2007 | Cheenath |
| 7,209,929 B2 | 4/2007 | Dominguez, Jr. et al. |
| 7,249,118 B2 | 7/2007 | Sandler et al. |
| 7,305,577 B2 | 12/2007 | Zhang |
| 7,308,704 B2 | 12/2007 | Vogel et al. |
| 7,340,411 B2 | 3/2008 | Cook |
| 7,350,237 B2 | 3/2008 | Vogel et al. |
| 7,373,364 B1 | 5/2008 | Chapman |
| 7,448,079 B2 | 11/2008 | Tremain |
| 7,484,219 B2 | 1/2009 | Mitra |
| 7,577,092 B2 | 8/2009 | San Andres et al. |
| 7,580,975 B2 | 8/2009 | Cheenath |
| 7,599,953 B2 | 10/2009 | Galindo-Legaria et al. |
| 7,620,655 B2 | 11/2009 | Larsson et al. |
| 7,693,820 B2 | 4/2010 | Larson et al. |
| 7,814,470 B2 | 10/2010 | Mamou et al. |
| 7,849,401 B2 | 12/2010 | Elza et al. |
| 2001/0023440 A1 | 9/2001 | Franklin et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015578 A1 | 1/2004 | Karakashian et al. |
| 2004/0015981 A1 | 1/2004 | Coker et al. |
| 2004/0027388 A1 | 2/2004 | Berg et al. |
| 2004/0044656 A1 | 3/2004 | Cheenath |
| 2004/0044718 A1* | 3/2004 | Ferstl et al. .................. 709/200 |
| 2004/0045004 A1 | 3/2004 | Cheenath |
| 2004/0064503 A1 | 4/2004 | Karakashian et al. |
| 2004/0111410 A1 | 6/2004 | Burgoon et al. |
| 2004/0128001 A1 | 7/2004 | Levin et al. |
| 2004/0143645 A1 | 7/2004 | Cheenath |
| 2004/0153714 A1* | 8/2004 | Kjellberg ......................... 714/4 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0220952 A1 | 11/2004 | Cheenath |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0095960 A1 | 5/2006 | Arregoces et al. |
| 2006/0100912 A1 | 5/2006 | Kumar et al. |
| 2006/0107261 A1* | 5/2006 | Vedula ......................... 718/100 |
| 2006/0136382 A1 | 6/2006 | Dettinger et al. |
| 2006/0206834 A1 | 9/2006 | Fisher et al. |

| | | | |
|---|---|---|---|
| 2007/0078705 A1 | 4/2007 | Abels et al. | |
| 2007/0088741 A1 | 4/2007 | Brooks et al. | |
| 2007/0124276 A1 | 5/2007 | Weissman et al. | |
| 2007/0130130 A1 | 6/2007 | Chan et al. | |
| 2007/0130137 A1 | 6/2007 | Oliver et al. | |
| 2007/0150303 A1 | 6/2007 | Cheenath | |
| 2007/0150546 A1 | 6/2007 | Karakashian et al. | |
| 2007/0226640 A1 | 9/2007 | Holbrook et al. | |
| 2008/0010243 A1 | 1/2008 | Weissman et al. | |
| 2008/0077566 A1 | 3/2008 | Fell et al. | |
| 2008/0082540 A1 | 4/2008 | Weissman et al. | |
| 2008/0082555 A1 | 4/2008 | Salmon et al. | |
| 2008/0082572 A1 | 4/2008 | Ballard et al. | |
| 2008/0082986 A1 | 4/2008 | Cheenath et al. | |
| 2008/0086358 A1 | 4/2008 | Doshi et al. | |
| 2008/0086447 A1 | 4/2008 | Weissman et al. | |
| 2008/0086479 A1* | 4/2008 | Fry et al. ................. | 707/10 |
| 2008/0086482 A1 | 4/2008 | Weissman | |
| 2008/0086514 A1 | 4/2008 | Weissman et al. | |
| 2008/0086567 A1 | 4/2008 | Langen et al. | |
| 2008/0086735 A1 | 4/2008 | Cheenath et al. | |
| 2008/0126333 A1 | 5/2008 | Bezar et al. | |
| 2008/0155310 A1 | 6/2008 | Langen et al. | |
| 2008/0162544 A1 | 7/2008 | Weissman et al. | |
| 2008/0201701 A1 | 8/2008 | Hofhansl et al. | |
| 2008/0215560 A1 | 9/2008 | Bell et al. | |
| 2008/0270354 A1 | 10/2008 | Weissman | |
| 2008/0270987 A1 | 10/2008 | Weissman | |
| 2009/0030906 A1 | 1/2009 | Doshi et al. | |
| 2009/0049065 A1 | 2/2009 | Weissman | |
| 2009/0049101 A1 | 2/2009 | Weissman | |
| 2009/0049102 A1 | 2/2009 | Weissman | |
| 2009/0049288 A1 | 2/2009 | Weissman | |
| 2009/0076990 A1* | 3/2009 | Iqbal et al. ................. | 706/21 |
| 2009/0254907 A1* | 10/2009 | Neary ................. | 718/102 |
| 2009/0276395 A1 | 11/2009 | Weissman et al. | |
| 2009/0276405 A1 | 11/2009 | Weissman et al. | |
| 2009/0282045 A1 | 11/2009 | Hsieh et al. | |
| 2009/0319529 A1 | 12/2009 | Bartlett et al. | |
| 2010/0191719 A1 | 7/2010 | Weissman et al. | |
| 2010/0198730 A1* | 8/2010 | Ahmed et al. ................. | 705/50 |
| 2010/0211619 A1 | 8/2010 | Weissman et al. | |
| 2010/0223284 A1 | 9/2010 | Brooks | |
| 2010/0235837 A1 | 9/2010 | Weissman et al. | |
| 2010/0274779 A1 | 10/2010 | Weissman et al. | |
| 2011/0093950 A1* | 4/2011 | Bhargava et al. ................. | 726/21 |

OTHER PUBLICATIONS

First named inventor: Varadharajan, Arunkumaran, U.S. Appl. No. 12/909,820, filed Oct. 21, 2010.
First named inventor: Pin, Oliver, U.S. Appl. No. 12/895,833, filed Sep. 30, 2010.
First named inventor: Press, William A., U.S. Appl. No. 12/850,502, filed Aug. 4, 2010.
First named inventor: Tanaka, Jay, U.S. Appl. No. 12/831,209, filed Jul. 6, 2010.
First named inventor: Tanaka, Jay, U.S. Appl. No. 12/831,196, filed Jul. 6, 2010.
First named inventor: Williams, Alexis, U.S. Appl. No. 13/028,236, filed Feb. 16, 2011.
Notification of Transmittal of the International Search Report and the Written Opinion of the International Searching Authority, or the Declaration. International Application Number: PCT/US2010/050021. International Filing Date: Sep. 23, 2010.
Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.
Wermelinger et al: "Using coordination contracts for flexible adaptation to changing business rules", Proceedings of the Sixth International Workshop on Software Evolution, NJ, USA, Sep. 1, 2003, pp. 115-120.
Lee et al: "Composition of executable business process models by combining business rules and process flows", Expert Systems With Application, Oxford, GB, vol. 33, No. 1, Dec. 22, 2006, pp. 221-229.
Mietzer et al: "Combining Different Multi-tenancy Patterns in Service Oriented Applications", IEE International Enterprise Distributed Object Computing Conference, NJ, USA, Sep. 1, 2009, pp. 131-140.
Wang et al: "Integrated Constraint Violation Handling for Dynamic Services Composition", IEE International Conference on Services Computing, NJ, USA, Sep. 21, 2009, pp. 168-175.
[online];[published on Oct. 17, 2008];[retrieved on Feb. 26, 2010]; retrieved from //en.wikipedia.org/wiki/Push_technology.
[online];[published on Oct. 16, 2008];[retrieved on Feb. 26, 2010]; retrieved from http://en.wikipedia.org/wiki/Customer_Realtionship_Management.
[online];[published on Apr. 22, 2008];[retrieved on Feb. 26, 2010]; retrieved from //en.wikipedia.org/wiki/Flat_file_database.
[online];[published on Apr. 25, 2008];[retrieved on Feb. 26, 2010]; retrieved from //en.wikipedia.org/wiki/Relational_database.
First named inventor: Doshi, Kedar, U.S. Appl. No. 12/167,991, filed Jul. 3, 2008.
First named inventor: Yancey, Scott, U.S. Appl. No. 12/132,409, filed Jun. 3, 2008.
First named inventor: Yancey, Scott, U.S. Appl. No. 12/197,979, filed Aug. 25, 2008.
First named inventor: Durdik, Paul, U.S. Appl. No. 12/369,710, filed Feb. 11, 2009.
First named inventor: Durdik, Paul, U.S. Appl. No. 12/549,349, filed Aug. 27, 2009.
First named inventor: Yancey, Scott, U.S. Appl. No. 12/636,658, filed Dec. 11, 2009.
First named inventor: Yancey, Scott, U.S. Appl. No. 12/569,603, filed Sep. 29, 2009.

* cited by examiner

US 8,443,366 B1

TECHNIQUES FOR ESTABLISHING A PARALLEL PROCESSING FRAMEWORK FOR A MULTI-TENANT ON-DEMAND DATABASE SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to databases. More particularly the current invention relates to techniques for utilizing computational resources in a multi-tenant on-demand database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The efficient retrieval of accurate information and subsequent delivery of this information to the user system has been and continues to be a goal of administrators of database systems.

Unfortunately, conventional database approaches might become inefficient if, for example, a relatively large number of users substantially concurrently access the database system.

Accordingly, it is desirable to provide techniques enabling an owner of the database system to improve the ease of use of the database system.

BRIEF SUMMARY

In accordance with embodiments, there are provided techniques for utilizing computational resources in a multi-tenant on-demand database system. These techniques enable embodiments to facilitate processing of a large quantity of data while reducing the probability that the database resources are unduly consumed. In an embodiment and by way of example, the method includes processing computational jobs; storing data related to the computational jobs in a queue table; and identifying, among the data, information concerning one of the computational jobs that may be partitioned as a plurality of tasks, such that each of the tasks may be processed independent of the remaining tasks of the plurality of tasks.

The present invention is described with reference to a multi-tenant on-demand database system that, inter alia, identifies, among the data, information concerning one of the computational jobs that may be partitioned as a plurality of tasks, such that each of the tasks may be processed independent of the remaining tasks of the plurality of tasks.

Although the system is discussed with respect to supporting multiple tenants; the present invention is not limited to multi-tenant database systems. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Systems and methods are provided for utilization of computational resources in a multi-tenant on-demand database system. As used herein, the term multi-tenant database system (MTS) refers to those systems in which various elements of hardware and software of the database system may be shared by one or more users. For example, a given application server may simultaneously process requests for a great number of customers, and a given database table may store rows for a potentially much greater number of customers.

Figure 1:
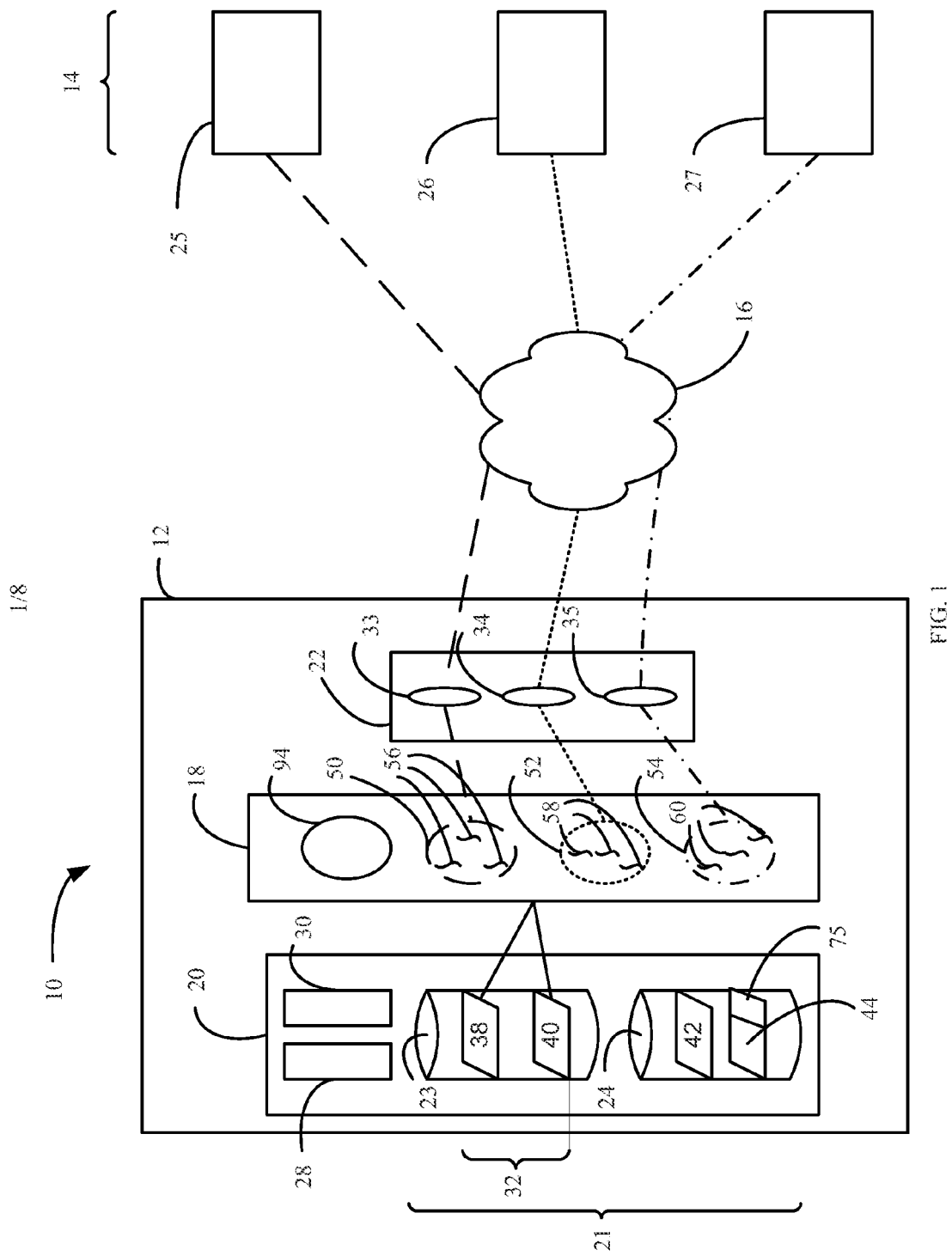
FIG. 1 illustrates a representative architecture for batch processing in a multi-tenant database system in accordance with one embodiment of the present invention.

FIG. 1 illustrates a database architecture 10 that includes server side facilities 12 and client side facilities 14 in data communication over a network 16. Server side facilities 12 includes processor sub-system 18, memory space 20, in data communication therewith, and network interface resources 22 in data communication with both memory space 20 and processor sub-system 18. Processor sub-system 18 may be any known processor sub-system in the art, e.g., the CORE DUO® or the CORE 2 DUO® from Intel Corporation of Santa Clara, Calif. Memory space 20 includes drive storage 21, shown as one or more hard drives 23 and 24, as well as data and instruction registers, shown as 28, and volatile and non-volatile memory shown as 30. Data communication network 16 may be any network or combination of networks of devices that communicate with one another. Network 16 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global inter-network of networks often referred to as the "Internet" with a capital "I," that network will be used in many of the examples herein. However, it should be understood that the networks that the present invention might use are not so limited, although TCP/IP is a frequently implemented protocol.

Server side facilities 12 provide access to a database 32 by multiple users 25-27 of client side facilities 14 over data communication network 16. To that end, network interface resources 22 include a plurality of virtual portals 33-35. Each virtual portal 33-35 provides an "instance" of a portal user interface coupled to allow access to database 32. Typically, tenants obtain rights to store information, referred to as tenant information 38 and 40, on database 32 and make the same accessible to one or more users 25-27 to whom the tenant provides authorization. This is typically achieved by rental agreements between the tenant and an owner/provider of architecture 10. In this manner, architecture 10 provides an on-demand database service to users 25-27 that are not necessarily concerned with building and/or maintaining the database system; rather, these functions are addressed between the tenant and the owner/provider.

With architecture 10, multiple users 25-27 may access database 32 through a common network address, in this example a universal resource locator (URL). In response, web-pages and other content may be provided to users 25-27 over network 16. The resources of database 32 that users 25-27 may access can be different, depending on user's 25-27 security or permission level and/or tenant association. As a result, data structures included in tenant information is managed so as to be allocated at the tenant level, while other data structures might be managed at the user level. Because architecture 10 supports multiple tenants including possible competitors, security protocols 42 and other system software 44, stored for example on hard drive 26, maintain applications and applications' use to only those users 25-27 with proper access rights. Also, because many tenants may desire access to architecture 10 rather than maintain their own system, redundancy, up-time, and backup are additional functions that may be implemented in architecture 10. In addition to user-specific data and tenant specific data, server side facilities 12 might also maintain system level data usable by multiple tenants or other data. Such system level data might include industry reports, news, postings, and the like that are sharable among tenants.

For example, in certain embodiments architecture 10 may allow users 25-27 associated with the tenant, referred to as tenant users, access to a sub-portion of the content of the database information that the tenant may be allowed to access. The sub-portion that any one of users 25-27 may access may be the same as, or different from, the sub-portion that the remaining users 25-27 may access. Users 25-27 not associated with a tenant may not be allowed access to information 38 and 40. For example, assume users 25 and 26 are associated with the tenant corresponding to tenant information 38 and not associated with the tenant corresponding to tenant information 40. Users 25 and 26 would not be allowed access to tenant information 40 and would be allowed access to tenant information 38 or a sub-portion thereof. In the present example, user 25 may be allowed access to a first portion of tenant information 38 and user 26 may be allowed access to a second portion of tenant information 38, which is mutually exclusive. Similarly, were user 27 associated with the tenant corresponding to tenant information 40 and not the tenant corresponding to tenant information 38, user 27 would be allowed to access tenant information 40, or a portion thereof, and not tenant information 38. It is possible, however, that one of users 25-27 are associated to the tenants corresponding to both sets of tenant information 38 and 40.

Virtual portals 33, 34 and 35 facilitate providing resources of database 32 on behalf of a tenant to users 25-27 associated with the tenant. Each user 25-27 logs into one of virtual portals 33, 34 and 35 to access resources of database 32 through a unique uniform resource locator (URL) or other type of address. Based on the URL and other identifying information associated with users 25-27, architecture 10 may determine the resources of database 32 users 25-27 may access. For example, user 25 communicates with database through virtual portal 33, user 26 communicates with database 32 through virtual portal 34, and user 27 communicates with database through virtual portal 35. It is possible, however, that all users 25-27 may use a common portal, as well. To that end, users 25-27 desiring to access resources of database 32 employ virtual portals 33, 34 and 35 to validate against the information stored on architecture 10, corresponding to the user 25-27 requesting access to a sub-portion of content on database 32.

The result of the communications between users 25-27 and server side facilities 12 results in multiple processes 50, 52 and 54 being executed by processor sub-system 18. Thus, it is desired that processor sub-system 18 be capable of providing uninterrupted interaction with users 25-27 to provide online transaction processing (OLTP) to each of users 25-27. As a result, each of processes 50, 52 and 54 may include one or more threads of execution. This is shown as threads 56 associated with process 50, threads 58 associated with process 52 and threads 60 associated with process 54.

Figure 2:
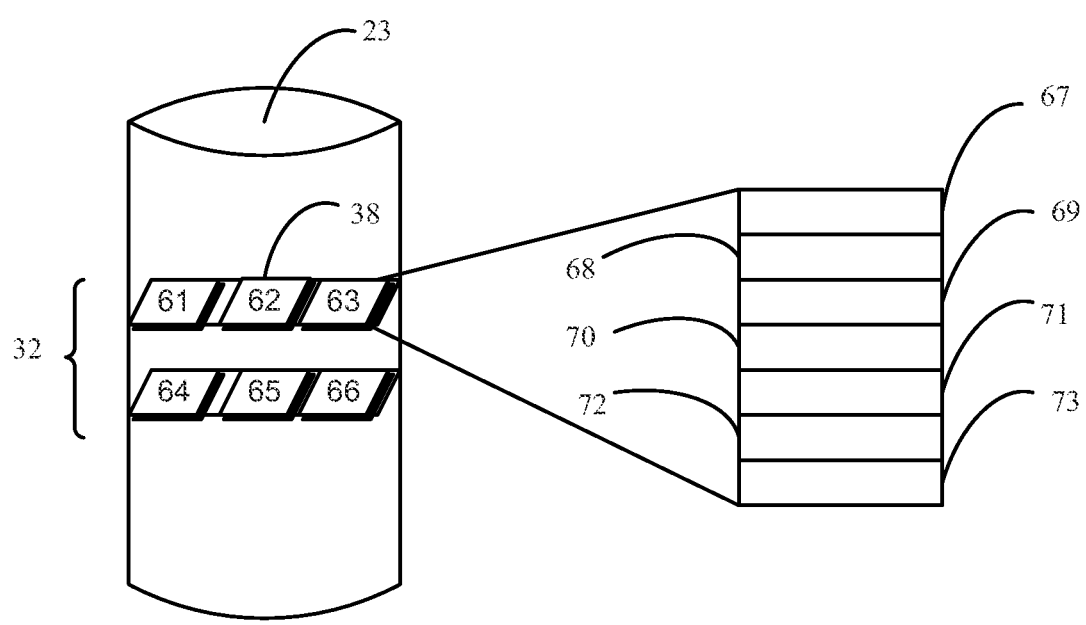
FIG. 2 is a simplified schematic view showing relationships between tenant information and objects stored on a database shown in FIG. 1 in accordance with the present invention.

Referring to both FIGS. 1 and 2, it is desired that tenants and/or users 25-27 associated therewith have the ability to easily and reliably manipulate large volumes of data while avoiding consuming excessive resources of processor sub-system 18. The challenge presented by these seemingly contravening requirements is understood by realizing the nature of the use of architecture 10 by tenants. An example of a tenant may be a company that employs a sales force where each salesperson uses server side facilities 12 to manage their sales process, such as by a management representative of the tenant, e.g., Vice President of Sales, the Chief Executive Officer of the tenant and the like. In this fashion, architecture facilitates Customer Relations Management (CRM). Thus, one or more of users 25-27 may be a salesperson that maintains information applicable to that salesperson's sales process and may be different from information related to other salespersons' sales process. Although the sales force accessing database 32 is represented by three users 25-27, in practice hundreds of salespersons would access database 32. Moreover, sales process data of each sales person may include thousands of files. An example of sales process data may include, without limitation, contact data, leads data, customer follow-up data, performance data, goals and progress data applicable to that salesperson's personal sales process.

Moreover, to facilitate management of this information, the tenant associated with the salespersons may restrict each of the salespersons to access specific sales process information. However, a tenant, or representative thereof based upon a contractual relationship between the salesperson and the representative, may be able to view all sale process information for the salespersons associated with the tenant. An example of a contractual relationship is a managerial/supervisory relationship. The managerial relationship between the salesperson and the tenant representative may provide the representative with a higher permission level when compared to the permission level of the salesperson, because, inter alia, the tenant representative may be a manager/supervisor of the salesperson. Another contractual relationship may be the principle agent relationship wherein the tenant representative has no day-to-day management responsibility of the salesperson. Nonetheless, as the representative of the principle, e.g., the tenant, the representative may view all of the salesperson information, because the salespersons may be deemed to be merely agents of the tenant.

Tenant information 38 and 40 may be viewed as a collection of objects, such as a set 61-66 of logical tables, containing data fitted into predefined categories. This is shown as data objects 67-73 with respect to tenant set 63. A "table" is one representation of a data object, and may be used herein to simplify the conceptual description of objects and custom objects according to the present invention. It should be understood that "table" and "object" may be used interchangeably herein. Thus, it is realized that large amounts of objects having complex interrelationships may be subject to a request for manipulation, for example, a managerial relationship between a salesperson or thousands of salespersons, may change. To implement this change may require a substantial percentage of the computational resources of the processor sub-system 18. Thus, manipulating such a large quantity of data objects 67-73 may interfere with the computing experience of users 25-27 taking advantage of OLTP processes 50, 52, and 54.

Figure 3:
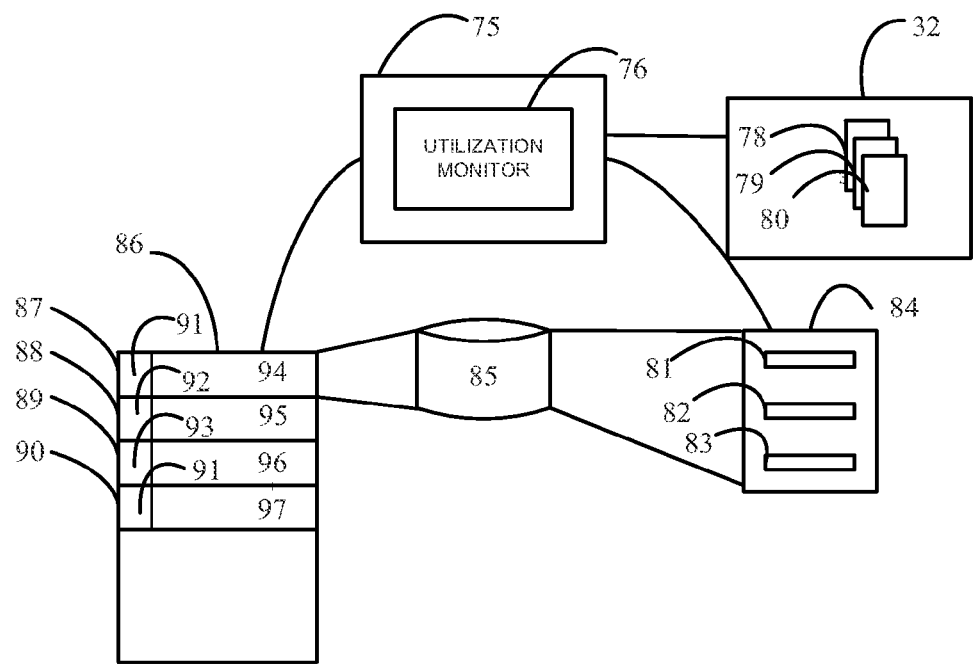
FIG. 3 is a plan view showing the relation between the processes of the parallel processing interface and objects in a database shown in FIG. 1.

Referring to FIGS. 1, 2 and 3, one embodiment of the current invention facilitates manipulation of large quantities of data objects, i.e., processing of computational jobs, in response to receiving a request from a tenant and/or users 25-27 while reducing the risk of interference, or perceived interference, with OLTP processes 50, 52 and 54. This is achieved by providing system software 44 with a parallel processing architecture (PPA) 75 that allows identifying, among the computational jobs, multiple tasks that may be processed concurrently, such as manipulating large number of objects 67-73 asynchronously with respect to OLTP processes 50, 52 and 54. PPA 75 also facilitates varying the number of threads 56, 58 and 60 available to process the tasks, as well as facilitates scheduling and execution of functions on large quantities of data at the request of a tenant and/or user 25-27. To that end, PPA 75 includes a utilization monitor (UM) 76 that monitors resource utilization levels within architecture 10. The PPA 75, informed by utilization data gathered by the UM 76, determines whether to increase or decrease the number of threads, such as threads 56, 58 and 60, acting against architecture 10. Specifically, upon receiving instructions to process jobs on a sub-content of data on architecture 10, e.g., tenant information 38 and 40, PPA 75 identifies an object/job class 78, 79 or 80 that maps to a job type with which one or more of the jobs to be processed are associated. Job classes 78, 79 and 80 define job handlers 84, 100 and 102, respectively. Job handlers 84, 100 and 102 are processes that are instantiated to carry-out the instructions. To that end, each job handler 84, 100 and 102, includes three methods, which are discussed with respect to job handler 84, but applies equally to job handlers 100 and 102, as well. As shown, job handler 84 includes a partition and enqueue method 81; a process method 82; and a call method 83. Partition and enqueue method 81 identifies data associated with a job. Process method 82 carries out the use defined process to be implemented on the data of the partition, and call method 83 carries-out standard operations upon completion of process method 82. The instructions are typically included in tenant information 38 and 40 or may be received, in situ, during one of OLTP processes 50, 52 and 54. PPA 75 instantiates an enqueue and dequeue (E/D) process 85 to asynchronously provide data concerning the job to handler 84.

Specifically, data concerning each job that is requested by one or more tenants is stored in an asynchronous queue (AQ) table 86, which may be resident in memory 30 by processor sub-system 18. As shown, data is included in AQ table 86 for jobs 87-90. E/D process 85 is implemented by PPA 75 to sequentially pop-off from AQ table 86, data concerning jobs 87-90. Data includes job type, e.g., object classes 78, 79 and 80, as well as payload information. As shown, jobs 87 and 90 are job type 91, job 88 is job type 92, and job 89 is job type 93. The payloads corresponding to jobs 87-90 are 94-97, respectively. The payload information identifies the sub-content of database 32 that is to be manipulated. Information related to each job type 91-93 is stored on database 32 in a table as indices related to methods 81-83 that are to be implemented. PPA 75 senses jobs 87-90 and instantiates job handler 84 and E/D process 85 for jobs present in AQ table 86. Job handler 84 operates under control of processor sub-system 18 to carry-out the processes, or methods, to manipulate the sub-content. Although not necessary, job handler 84 and E/D processes 85 are custom code provided by tenant so that when PPA 75 senses data in AQ table 86 corresponding to a job type, job handler 84 and E/D process 85 are instantiated.

Figure 4:
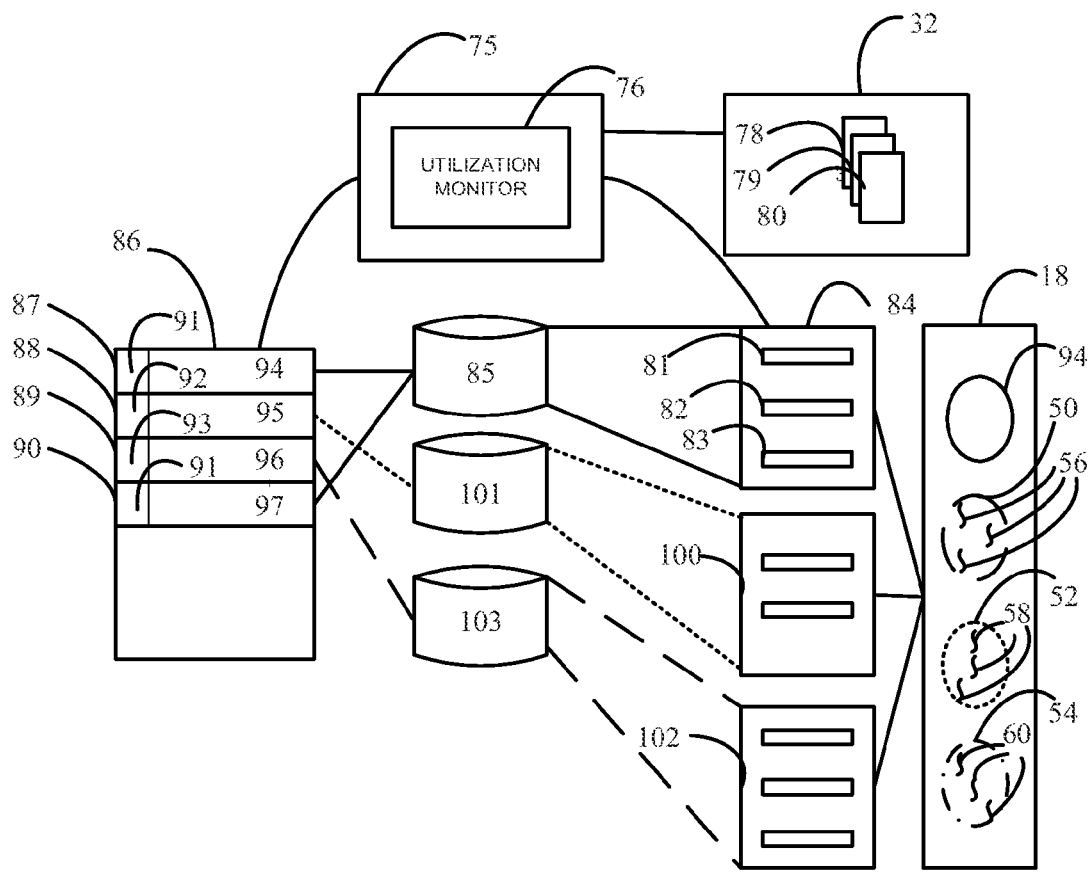
FIG. 4 is a plan view showing the relation between the processes of the parallel processing interface and objects in a database shown in FIG. 1, in accordance with a first alternate embodiment of the present invention.

Referring to both FIGS. 1 and 4, in one example, PPA 75 varies computational resources of architecture 10 allocated to process jobs by instantiating an appropriate job handler and enqueue/dequeue (E/D) process for each of the different job types in AQ table 86. As shown, PPA 75 has instantiated job handler 84 and E/D process 85 for job type 91, job handler 100 and E/D process 101 for job type 92, and job handler 102 and E/D process 103 for job type 93. In this example, each of the plurality of job 84, 100 and 102 handlers are configured to operate upon a type of job that is different than the type of jobs upon which the remaining job handlers 84, 100, 102 are configured to operate upon. In the present example, the E/D processes 85, 101 and 103 is in data communication with one of the job handlers 84, 100, and 102 such that the E/D process 85, 101 and 103 in data communication with one of job handlers 84, 100 and 102 is different than E/D processes 85, 101 and 103 in data communication with remaining job handlers 84, 100 and 102. However, it is not necessary that each job handler 84, 100 and 102 operate upon a type of job that is different from the other job handlers 84, 100 and 102, discussed more fully below. Similarly, it is not necessary that each E/D process 85, 101, and 102 be in data communication with a different job handler 84, 100 and 102.

Typically, the job handlers 84, 100 and 102 are instantiated in sequence as the job corresponding thereto advances in the queue of the jobs to be processed present in AQ table 86. It should be borne in mind that were a job handler 84, 100 and 102 and E/D process 85, 101 and 103 currently instantiated for corresponding job in AQ table 86 there is no need for PPA 75 to instantiate an additional job handler 84, 100 and 102 and E/D process 85, 101 and 103, absent other consideration. As discussed above, job handlers 84, 100 and 102 and E/D processes 85, 101 and 103 may be custom code provided by a tenant, or users 25-27, so that when PPA 75 senses data in AQ table 86 corresponding to job type 91-93, PPA 75 instantiates appropriate job handlers 84,100 and 102 and E/D processes 85, 101 and 103 when necessary, i.e., if the appropriate job handler 84, 100 and 102 and E/D process 85, 101 and 103 is not currently instantiated. The result is that PPA 75 varies the number of job handlers 84, 101, 102 and E/D processes 85, 101, 103 in response to utilization of the computational resources of architecture 10 to ensure that the same are utilized efficiently. This is achieved by instantiating, maintaining and/or terminating execution of job handlers 84, 101 and 102 and E/D processes 85, 101 and 103, as appropriate. As a result, PPA 75 instantiates and/or maintains job handler 84, 100 and 102 and E/D process 85, 101 and 103 for only those job types 91-93 corresponding to jobs 87-90 in AQ table 86 and in an appropriate sequence and appropriate duration. No other dequeue processes and job handlers are instantiated, unless required, i.e., a job is present in the AQ table 86 that require an E/D process and/or job handler not currently instantiated.

Moreover, once a job is complete and there are no other jobs to process for the job type associated with the completed job, PPA 75 terminates the job hander and E/D process corresponding to the job to free-up resources of architecture 10. The criteria for terminating job handlers 84, 100 and 102 and E/D processes 85, 101 and 103 may depend upon the operation desired by the owner of architecture 10. It is conceivable that there could be latency between termination of job handlers 84, 100 and 102 and E/D processes 85, 101 and 103 upon completion of a job and the absence of the presence of a job type corresponding to the completed job being present AQ table 86. This may be based upon a priori historical information concerning the historical computational requirements of the job type and/or other consideration, such as contractual rights and responsibilities between the tenant associated with the job type and the owner of architecture 10 and real time, in situ, consumption of resources of architecture 10 of concurrently running processes on other job types. Conversely, job handlers 84, 100 and 102 and E/D processes 85, 101 and 103 may be terminated immediately by PPA 75 upon completion of a job, independent of whether a corresponding job type is present in AQ table 86. In this manner, PPA 75 would instantiate an appropriate job handler 84, 100 and 102 and E/D process 85, 101 and 103 upon the corresponding job type being next to be popped-off of the queue of AQ table 86.

Figure 5:
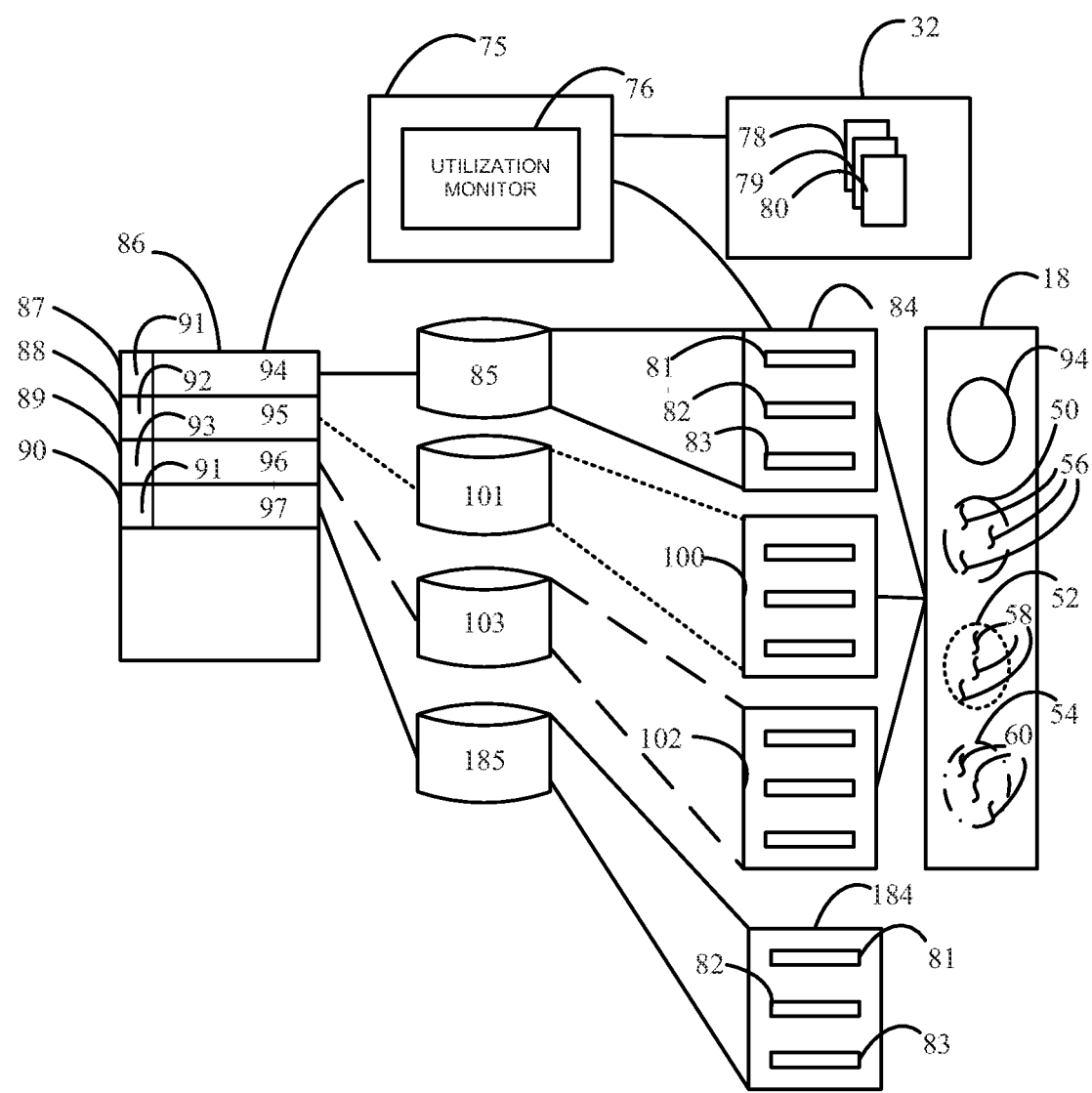
FIG. 5 is a plan view showing the relation between the processes of the parallel processing interface and objects in a database shown in FIG. 1, in accordance with a second alternate embodiment of the present invention.

Referring to both FIGS. 1 and 5, additional efficiency of resource utilization within the architecture is realized by real time monitoring of resource utilization in furtherance of instantiating additional job handlers and E/D processes should any given job type require additional resources of architecture 10. For example, were PPA 75 to determine that job type 91 require additional resources, an additional job handler 184, and an additional E/D process 185 could be instantiated that were identical to job handler 84 and E/D process 85, respectively. It should be understood that in some embodiments PPA 75 may instantiate job handler 184 that may be in data communication with E/D process 85, i.e., E/D process 85 is in data communication with both job handlers 84 and 184 (not shown). In this manner, job types requiring greater resources may be addressed in situ by allocating the resources to the job types when the resources are available. It may be that certain job types, e.g., job type 92, need not require processing immediately. This may be determined from a priori information, e.g., historical information concerning job type 92, which may be recorded in tenant information 38 and 40. As a result, should architecture 10 require greater and greater time to complete computational tasks for one or more given job types due to, e.g., the computational activity with other job types, e.g., job type 91, PPA 75 may cease allocation of resources to job type 92, until job type 91 has either completed, or has reached a desired percentage of resource utilization of architecture 10.

Alternatively, it may be that the contractual arrangements with the tenant that corresponds to job type 92 may be such that completion of the manipulation of the data may be delayed until the owner of architecture may process the same in accordance with the owner's protocol. In this manner, the tenant having the greatest priority may be allowed to complete processing of a job type to the prejudice of other tenants. Similarly, it may be that two different job types are associated with a common tenant, however, one of the job types are provided with priority over any other job type of the tenant. PPA 75 operates to free-up resources of architecture 10 by terminating the job handler and dequeue process for one of the job types and increase a number of job handlers and dequeue processes for another job type. In this manner, the job type having the greatest priority may be allowed to complete processing of a job type to the prejudice of other job types for a common tenant. Alternatively, or in addition thereto, processing of a job type may be terminated to advance the processing of jobs of one tenant to the prejudice of another tenant. For example, it may be that job type 84 is associated with a tenant that has greater priority than job type 91. Were PPA 75, while monitoring the utilization of architecture 10, to determine that the processing cycles required to complete processing of jobs of job type 84 were taking longer than desired, e.g., allowed by contract, then processing of job type 91 may be terminated. Termination of processing of job types 91 is in furtherance of freeing-up resources of architecture 10 to more quickly process job types 84.

Figure 6:
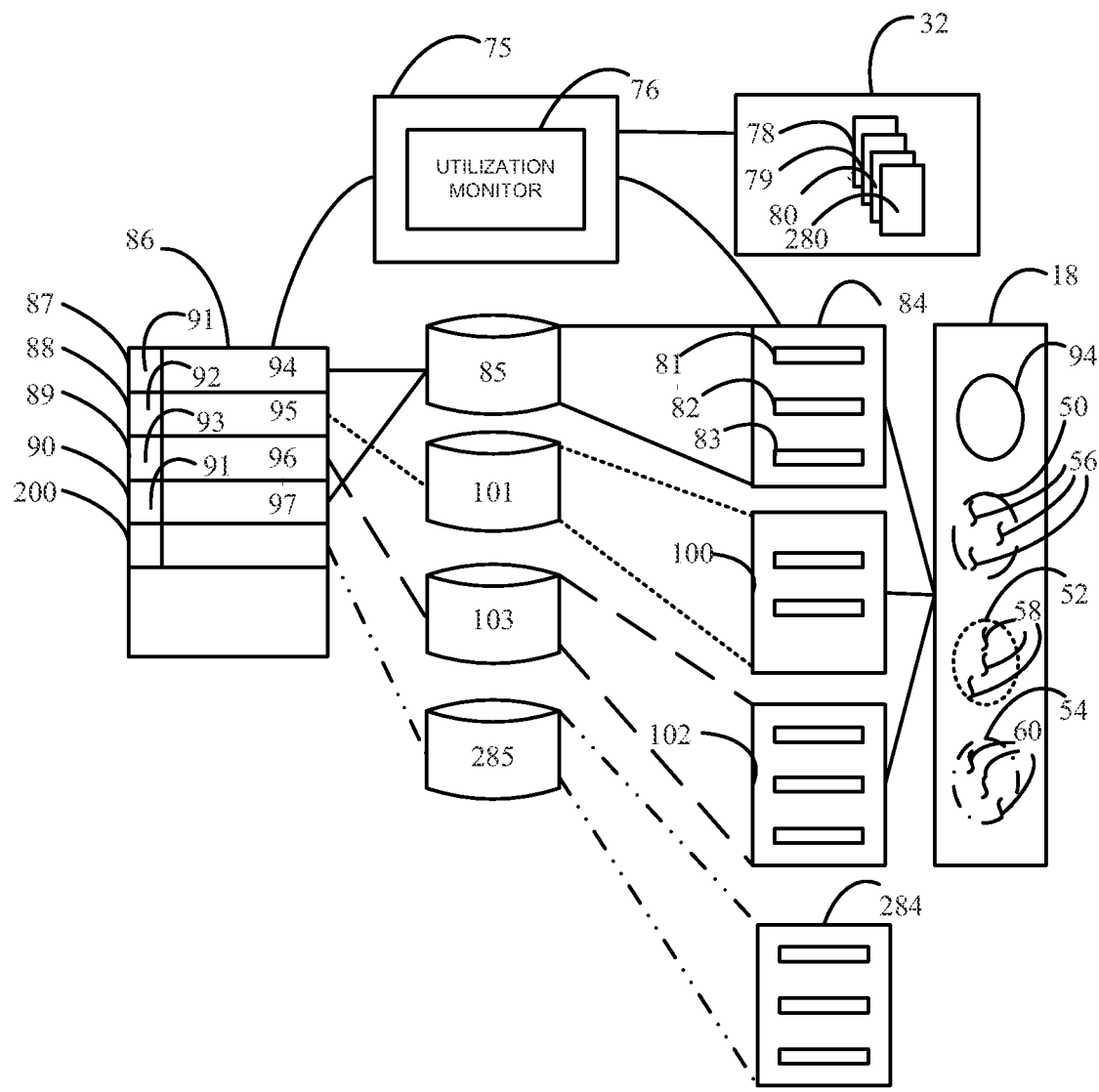
FIG. 6 is a plan view showing the relation between the processes of the parallel processing interface and objects in a database shown in FIG. 1, in accordance with a third alternate embodiment of the present invention.

Referring to both FIGS. 1 and 6, in accordance with another embodiment, to increase the computational efficiency of architecture 10 for a specific job type, a tenant is provided with the functionality to partition any job into a plurality of individual tasks. In this manner, a single job may have the individual tasks processed concurrently, each of which has a unique thread of operation in processor subsystem 18. This is referred to as a parallel processing job (PPJ) type 200. An object class 280 that maps to PPJ type 200 is defined by the tenant or users 25-27. Object class 280 defines a job handler 284, and has an E/D process 285 tailored to process the plurality of tasks for a common job of PPJ type 200. To that end, the tenant or users 25-27 define the partitions. The partitions include subsets of data of database 32 associated with a common job of PPJ type 200. The subset of data in a given partition may not be associated with any other partitions for the common job or with any other processes or thread 56, 58 and 60 operating on data associated with other partitions of the common job during processing. Each of threads 56, 58 and 60 operating on a common job is associated with a partition thereof that is different from the partition associated with the remaining threads operating on a common job. In this manner, a common job is divided into a plurality of task that may be processed concurrently. Each tasks associated with a common job is said to be independent of the remaining tasks associated with the common job by virtue of the association of the subset of data with a partition. The instantiation of PPJ handler 284 and PPJ E/D process 285 is as discussed above with respect to job handlers 84, 101 and 102 and E/D processes 85, 101 and 103. Employing PPJ type 200 the computational efficiency of architecture 10 is increased by avoid unnecessary delays in processing of the plurality of individual tasks associated with a common job. All of the independent individual tasks may be processed concurrently, depending upon the resource utilization of architecture 10. As a result, architecture 10 supports concurrent use of a data set amongst different jobs/job, as well as exclusively use mechanisms, latches or locks, for tasks associated with PPJ types 200.

Figure 7:
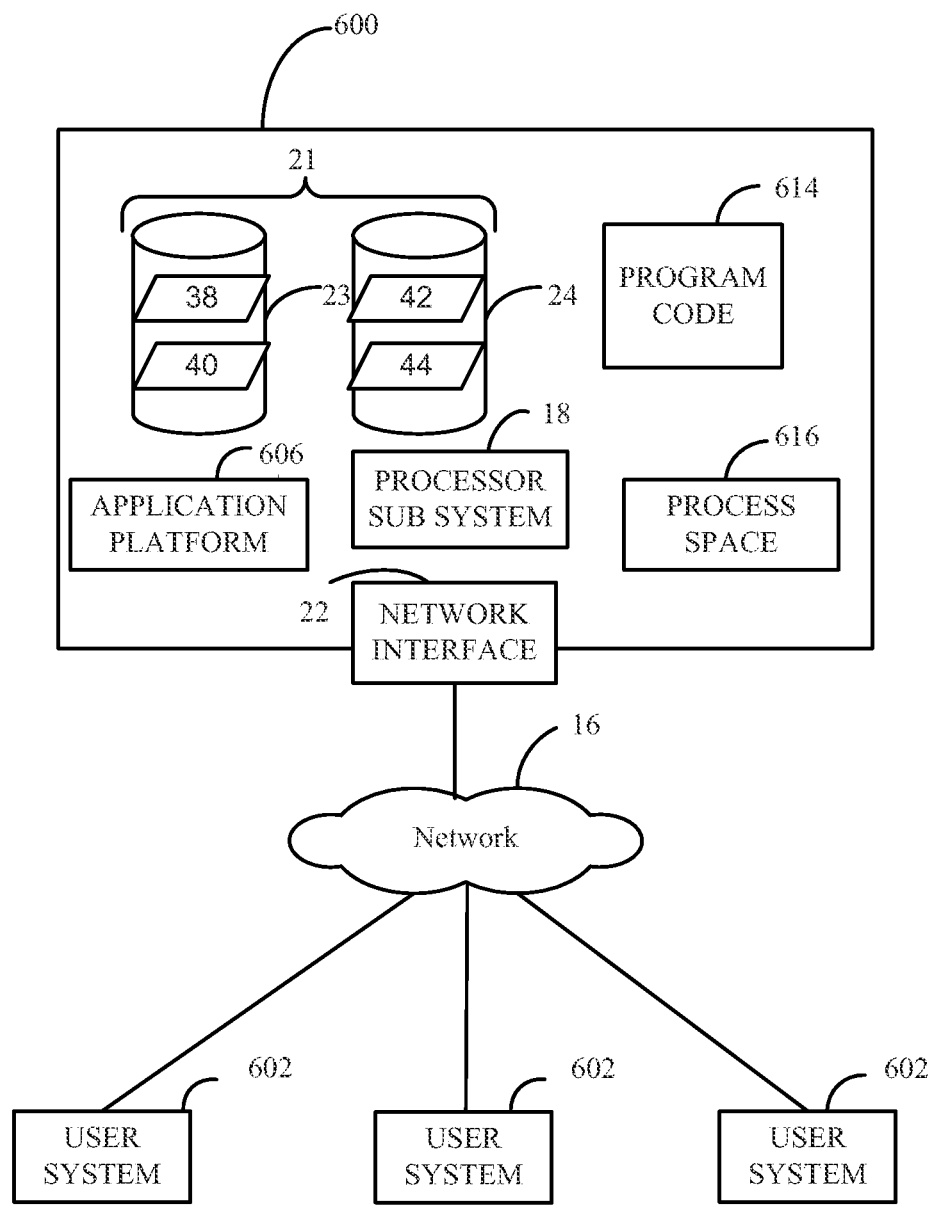
FIG. 7 illustrates a block diagram of an example of a representative system in which the architecture, shown in FIG. 1. may be practiced.

Referring to both FIGS. 1 and 7 a block diagram of a server system 600 employed to implement architecture 10 is shown as including multiple user systems 602 included in client side facilities 14 and in data communication with server system 600 over network 16. Server system 600 includes a processor sub-system 18, application platform 606, network interface 22, and drive storage 31 that includes database 32. In addition server system 600 includes program code 614, and process space 616. Program code 614 may include, among other code, code to facilitate a tenant to control the look-and-feel of the experience users 25-27 have when accessing database 32. Process space 616 facilitates execution of MTS system processes and tenant-specific processes, such as running applications as part of an application hosting service. Additional processes that may execute on server system 600 include database indexing processes. In other embodiments, server system 600 may not have all of the components listed and/or may have other elements instead of, or in addition to, those listed above. Server system 600, and additional instances of an MTS, where more than one is present, and all components thereof may be operator configurable using applications including computer code to run using a central processing unit such as processor sub-system 18.

Application platform 606 may be a framework that allows the applications of architecture 10 to run, such as the hardware and/or software, e.g., the operating system. In an embodiment, application platform 606 may enable creation, managing and executing one or more applications developed by the owner/provider of architecture 10, users 25-27 accessing architecture 10 via user systems 602, or third party application developers accessing architecture 10 via user systems 602.

In one embodiment, server system 600 implements a web-based customer relationship management (CRM) system. For example, in one embodiment, server system 600 includes application servers configured to implement and execute CRM software applications as well as provide related data, code, forms, webpages and other information to and from user systems 602 and to store to, and retrieve from, database system related data, objects, and Webpage content. Architecture 10 typically stores data for multiple tenants in the same physical database object, however, tenant data typically is arranged so that data of one tenant is kept logically separate from that of other tenants so that one tenant does not have access to another tenant's data, unless such data is expressly shared. In certain embodiments, server system 600 implements applications other than, or in addition to, the CRM application discussed above. For example, server system 600 may provide tenant access to multiple hosted (standard and custom) applications, including a CRM application. User (or third party developer) applications, which may or may not include CRM, may be supported by the application platform 606, which manages creation, storage of the applications into one or more database objects and executing of the applications in a virtual machine in the process space of server system 600.

Figure 8:
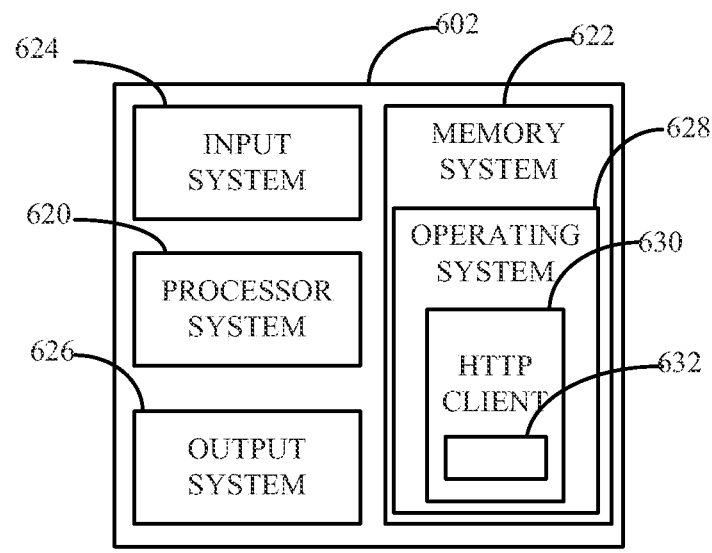
FIG. 8 is a detailed block diagram of a user system, shown in FIG. 7.

Referring to FIGS. 1, 7 and 8, to facilitate web-based CRM, user systems 602 might communicate with server system 600 using TCP/IP and, at a higher network level, use other common Internet protocols to communicate, such as HTTP, FTP, AFS, WAP, etc. To that end, user systems 602 may be any computing device capable of interfacing directly or indirectly to the Internet or other network connection, such as desktop personal computer, workstation, laptop, PDA, cell phone, or any wireless access protocol (WAP) enabled device and the like running an HTTP client 49. An example of a user system 602 includes a processor system 620, a memory system 622, an input system 624, and output system 626. Processor system 620 may be any combination of one or more processors. Memory system 622 may be any combination of one or more memory devices, volatile, and/or non-volatile memory. A portion of memory system is used to run operating system 628 in which HTTP client 630 executes. Input system 624 may be any combination of input devices, such as one or more keyboards, mice, trackballs, scanners, cameras, and/or interfaces to networks. Output system 626 may be any combination of output devices, such as one or more monitors, printers, and/or interfaces to networks. HTTP client 630 allows users 25-27 of users systems 602 to access, process and view information, pages and applications available to it from server system 600 over network 16. Examples of HTTP client 630 include various browsing applications, such as Microsoft's Internet Explorer browser, Netscape's Navigator browser, Opera's browser, or a WAP-enabled browser in the case of a cell phone, PDA or other wireless device, or the like. Access is gained to requisite tenant information 38 and 40 by entering the URL (not shown) into the URL box 632 of HTTP client 630. The URL directs users 25-27 to the appropriate virtual portal for to determine authorization and permission level to access the requisite tenant information.

Data corresponding with each user 25-27 may be separate from the data corresponding to the remaining users 25-27 regardless of the tenant associated with users 25-27; however, some data might be shared or accessible by a plurality of users 25-27 or all of users 25-27 associated with a tenant. Thus, there might be some data structures managed by server system 600 that are allocated at the tenant level while other data structures might be managed at the user level. Because an MTS typically support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, server system 600 might also maintain system level data usable by multiple tenants or other data. Such system level data might include industry reports, news, postings, and the like that are sharable among tenants.

According to one embodiment, server system 600 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
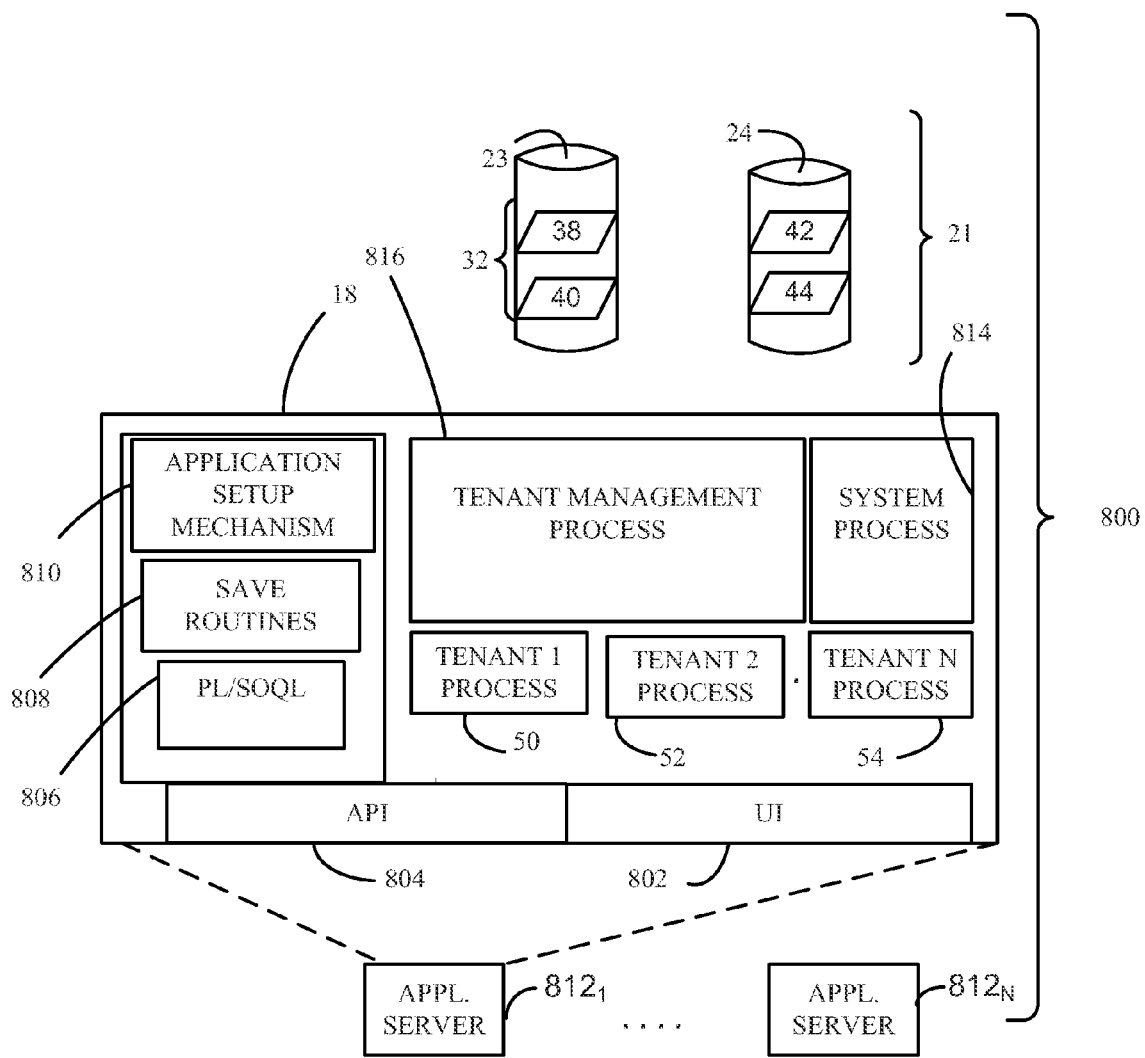
FIG. 9 illustrates a block diagram of an embodiment of elements of FIG. 7 and various possible interconnections between these elements.

Referring to FIG. 9, a specific embodiment of a server system 800 includes database 32, as discussed above, as well as processor sub-system 18 and a network interface 122. In addition, server system 800 includes a user interface (UI) 802, application program interface (API) 804, PL/SOQL 806, save routines 808, an application setup mechanism 810, applications servers $812_1$-$812_N$, system process space 814, tenant processes 50, 52 and 54, tenant management processes 816. User interface (UI) 802, application program interface (API) 804, PL/SOQL 806, save routines 808, an application setup mechanism 810, tenant processes 50, 52 and 54, tenant management processes 816 are shown as processes running in processor sub-system 18. However, it should be noted that the computer readable code to implement the processes may be stored on drive storage 31. In other embodiments, server system 800 may not have the same elements as those listed above and/or may have other elements instead of, or in addition to, those listed above. Network interface 122 is implemented as a plurality of HTTP application servers $812_1$-$812_N$.

Referring to FIGS. 1, 6 and 8, each application server $812_1$-$812_N$ may be configured to service requests of user systems 602 for access to database 32. In this configuration, tenant information 38 and 40 consists of different information storage areas that may physical differentiation, e.g., different hard disks, and/or a logical separation of the information and may include application metadata 92 for each user or groups of users. For example, a copy of a user's most recently used (MRU) items might be included. Similarly, a copy of MRU items for an entire organization that is a tenant might be stored. UI 802 provides a user interface and API 804 provides an application programmer interface to server system 800 resident processes to users and/or developers at user systems 602. The tenant data and the system data may be stored in various databases, such as one or more Oracle™ databases.

Referring again to FIGS. 1, 6 and 8, it is not necessary that the one or more HTTP application servers $812_1$-$812_N$ be implemented as the sole network interface between server system 800 and network 16. Rather, other communication techniques might be used in conjunction with HTTP application servers $812_1$-$812_N$ or in lieu thereof. In some implementations, the interface between server system 800 and network 16 includes load sharing functionality, such as round-robin HTTP request distributors to balance loads and distribute incoming HTTP requests evenly over a plurality of servers. At least as for users 25-27 one of HTTP application servers $812_1$-$812_N$, each of the plurality of servers has access to the MTS data; however, other alternative configurations may be used instead.

Application platform 606 includes an application setup mechanism 810 that supports application developers' creation and management of applications, which may be saved as metadata by save routines 808 for execution by subscribers as one or more tenant process spaces 84 managed by tenant management process 86, for example. Invocations to such applications may be coded using PL/SOQL 806 that provides a programming language style interface extension to API 804. A detailed description of some PL/SOQL language embodiments is discussed in commonly owned co-pending U.S. patent application Ser. No. 11/859,498 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata for the subscriber making the invocation and executing the metadata as an application in a virtual machine.

Each HTTP application servers $812_1$-$812_N$ may be communicably coupled to database systems, e.g., database 32, via a different network connection. For example, one HTTP application server $812_1$ might be coupled via the network 16 (e.g., the Internet), another HTTP application servers $812_1$-$812_N$ might be coupled via a direct network link, and another one of HTTP application servers $812_1$-$812_N$ might be coupled by yet a different network connection. Transfer Control Protocol and Internet Protocol (TCP/IP) are typical protocols for communicating between HTTP application servers $812_1$-$812_N$ and database 32. However, it will be apparent to one skilled in the art that other transport protocols may be used to optimize the system depending on the network interconnect used.

In certain embodiments, each of HTTP application servers $812_1$-$812_N$ is configured to handle requests for any user associated with any organization that is a tenant. Because it is desirable to be able to add and remove application servers from the server pool at any time for any reason, there is preferably no server affinity for a user and/or organization to a specific one of HTTP application servers $812_1$-$812_N$. In one embodiment, therefore, an interface system implementing a load balancing function (e.g., an F5 Big-IP load balancer) is communicably coupled between HTTP application servers $812_1$-$812_N$ and the user systems 602 to distribute requests to HTTP application servers $812_1$-$812_N$. In one embodiment, the load balancer uses a least connections algorithm to route user requests to HTTP application servers $812_1$-$812_N$. Other examples of load balancing algorithms, such as round robin and observed response time, also can be used. For example, in certain embodiments, three consecutive requests from the same user 25-27 could hit three different HTTP application servers $812_1$-$812_N$, and three requests from different user systems 602 could hit a common HTTP application server $812_1$-$812_N$. In this manner, server system 800 is multi-tenant, wherein server system 800 handles storage of, and access to, different objects, data and applications across disparate users and organizations.

In certain embodiments, user systems 602 (which may be client systems) communicate with HTTP application servers $812_1$-$812_N$ to request and update system-level and tenant-level data from server system 800 that may require sending one or more queries to database 32. Server system 800 (e.g., an application server 812 in server system 800) automatically generates one or more SQL statements (e.g., one or more SQL queries) that are designed to access the desired information. Database may generate query plans to access the requested data from the database.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, the present processes may be embodied as a computer program product that includes a machine-readable storage medium (media) having instructions stored thereon/in which can be used to program a computer to perform any of the processes of the embodiments described herein.

Computer code for operating and configuring the server system to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.). Therefore, the scope of the appended claims should be accorded the broadest interpretation so as to encompass all such modifications and similar arrangements.

The invention claimed is:

1. A method of establishing a parallel processing framework for a multi-tenant on-demand database system, the method comprising:
processing computational jobs;
storing data related to said computational jobs in a queue table of a database including a plurality of job types;
identifying, among said data, information concerning a plurality of job classes which maps to a plurality of job types that are associated with the computational jobs to be processed and also identifying one of said computational jobs that may be partitioned as a plurality of tasks and a job type of the one of said computational jobs, such that each of said tasks may be processed independent of the remaining tasks of said plurality of tasks, wherein the plurality job classes defines a plurality of job handlers for processing the computational jobs and initiating a job handler appropriate for processing the one of said computational jobs based on the job type; and
wherein, upon completion of the one of said computational jobs, termination of the job handler of the one of said computational jobs is dependent upon historical information concerning historical computational requirements of a job type, present in the queue table, corresponding to the job type of the one of said computation jobs.

2. The method as recited in claim 1 wherein identifying further comprises identifying information that defines a plurality of partitions each of which is associated with a subset of data on said database, the subset of data associated with one of said plurality of partitions being different from the subset of data associated with the remaining partitions of said plurality of partitions.

3. The method as recited in claim 1 wherein identifying further comprises identifying information that defines a plurality of partitions each of which is associated with a subset of data on said database, the subset of data associated with one of said plurality of partitions being different from the subset of data associated with the remaining partitions of said plurality of partitions, with the subset of data of said partitions being concurrently accessible by a subgroup of the remaining computational jobs.

4. The method as recited in claim 1 wherein processing further comprises processing each of said plurality of tasks as a thread of execution defining multiple threads of execution, with said multiple threads of execution being concurrently executed during said processing.

5. The method as recited in claim 1 wherein processing further comprises initiating a job handler and an enqueue/dequeue processes, in data communication with said job handler, to process said one of said computational jobs.

6. The method as recited in claim 5 further comprising initiating additional instances of said job handler in response to resource utilization of said database.

7. The method as recited in claim 1 wherein processing further comprise executing a plurality of job handlers and enqueuing/dequeuing process with a subset of said plurality of job handlers configured to operate upon a job type that is different than the job type upon which the remaining job handlers of said plurality of job handlers are configured to operate upon.

8. The method as recited in claim 1 wherein processing further comprises executing a plurality of job handlers and enqueuing/dequeuing processes with each of said plurality of job handlers configured to operate upon a job type that is different than the job type upon which the remaining job handlers of said plurality of job handlers are configured to operate upon.

9. A non-transitory machine-readable medium storing one or more sequences of instructions for establishing a parallel processing framework for a multi-tenant on-demand database system, when executed by one or more processors, cause said one or more processors to:
process computational jobs;
store data related to said computational jobs in a queue table of a database including a plurality of job types;
identify, among said data, information concerning a plurality of job classes which maps to a plurality of job types that are associated with the computational jobs to be processed and also identifying one of said computational jobs that may be partitioned as a plurality of tasks and a job type of the one of said computational jobs, such that each of said tasks may be processed independent of the remaining tasks of said plurality of tasks, wherein the plurality job classes defines a plurality of job handlers for processing the computational jobs and initiating a job handler appropriate for processing the one of said computational jobs based on the job type; and wherein, upon completion of the one of said computational jobs, termination of the job handler of the one of said computational jobs is dependent upon historical information concerning historical computational requirements of a job type, present in the queue table, corresponding to the job type of the one of said computation jobs.

10. The machine-readable medium as recited in claim 9 wherein said instructions for identifying further comprises instructions to identify information that defines a plurality of partitions each of which is associated with one of said plurality of partitions being different from the subset of data associated with the remaining partitions of said plurality of partitions.

11. The machine-readable medium as recited in claim 9 wherein said instructions for identifying further comprises instructions to identify information that defines a plurality of partitions each of which is associated with a subset of data on said database, the subset of data associated with one of said plurality of partitions being different from the subset of data associated with the remaining partitions of said plurality of partitions, with the subsets of data of said partitions being concurrently accessible by a subgroup of the remaining computational jobs.

12. The machine-readable medium as recited in claim 9 wherein said instructions for processing further comprises instructions to process each of said plurality of tasks as a thread of execution defining multiple threads of execution, with said multiple threads of execution being concurrently executed during said processing.

13. The machine-readable medium as recited in claim 9 wherein said instructions for processing further comprises instructions to initiate a job handler and an enqueue/dequeue processes, in data communication with said job handler, to process said one of said computational jobs.

14. The machine-readable medium as recited in claim 9 wherein said instructions for processing further comprises instructions to execute a plurality of job handlers and enqueuing/dequeuing processes with a subset of said plurality of job handlers configured to operate upon a job type that is different than the job type upon which the remaining job handlers of said plurality of job handlers are configured to operate upon.

15. A system for establishing a parallel processing framework in a multi-tenant database, said system comprising:
- a processor; and
- a memory having a sequence of instructions which, when executed by the processor, cause the processor to:
  - process computational jobs;
  - store data related to said computational jobs in a queue table of a database including a plurality of job types;
  - identify, among said data, information concerning a plurality of job classes which maps to a plurality of job types that are associated with the computational jobs to be processed and also identifying one of said computational jobs that may be partitioned as a plurality of tasks and a job type of the one of said computational jobs, such that each of said tasks may be processed independent of the remaining tasks of said plurality of tasks, wherein the plurality job classes defines a plurality of job handlers for processing the computational jobs and initiating a job handler appropriate for processing the one of said computational jobs based on the job type; and
- wherein, upon completion of the one of said computational jobs, termination of the job handler of the one of said computational jobs is dependent upon historical information concerning historical computational requirements of a job type, present in the queue table, corresponding to the job type of the one of said computation jobs.

* * * * *